(12) United States Patent
Spruit (10) Patent No.: US 6,751,513 B1
(45) Date of Patent: *Jun. 15, 2004

(54) METHOD AND DEVICE FOR RECORDING AN OPTICAL INFORMATION CARRIER

(75) Inventor: Johannes Hendrik Spruit, Eindhoven (NL)

(73) Assignee: Koninklijke Philips Electronics N.V, Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/688,646

(22) Filed: Oct. 16, 2000

Related U.S. Application Data (63) Continuation of application No. 08/930,805, filed on Oct. 8, 1997, now Pat. No. 6,205,102.

(30) Foreign Application Priority Data

Feb. 16, 1996 (EP) .............................................. 96200387

(51) Int. Cl.[7] ............................ G06F 17/00; G11B 5/09; G11B 3/00

(52) U.S. Cl. ........................ 700/94; 369/59.11; 369/116
(58) Field of Search ............................................ 700/94

(56) References Cited

U.S. PATENT DOCUMENTS

| 5,109,373 A | 4/1992 | Ohno et al. ............... 369/100 |
| 6,205,102 B1 * | 3/2001 | Spruit ..................... 369/59.11 |

FOREIGN PATENT DOCUMENTS

| JP | 3283021 A | 12/1991 | .............. G11B/7/00 |

* cited by examiner

Primary Examiner—F. W. Isen
Assistant Examiner—Elizabeth McChesney
(74) Attorney, Agent, or Firm—Michael E. Belk (57) ABSTRACT

A method is described for recording an optical information carrier, in which a mark representing recorded data is written in the information carrier at different writing speeds by a sequence of radiation pulses The last pulse of a sequence is followed by a period of reduced radiation power, the duration of which is inversely proportional to the writing speed.

4 Claims, 4 Drawing Sheets

METHOD AND DEVICE FOR RECORDING AN OPTICAL INFORMATION CARRIER

CROSS REFERENCE TO RELATED APPLICATIONS

This is a continuation of application Ser. No. 08/930,805, filed Oct. 8,1997 now U.S. Pat. No. 6,205,102.

FIELD OF THE INVENTION

The invention relates to the field of digital optical recording on disk-shaped information carriers. More specifically, the invention most closely relates to recording on rewriteable phase-change disks.

BACKGROUND OF THE INVENTION

The invention relates to a method of recording marks representing data, at a predetermined writing speed or at different writing speeds in an information layer of an optical information carrier by irradiating the information layer with a pulsed radiation beam. Each mark is written by a sequence of one or more pulses having a first radiation power level. The invention also relates to an optical recording device for carrying out the recording method. The method is suitable for direct-overwrite on an information carrier, i.e. by writing information to be recorded in the information layer of the carrier and at the same time erasing information previously written in the information layer. The method can be used for direct-overwriting in information layers made of a phase-change material.

The writing speed is the magnitude of the velocity between the information layer of the information carrier and a spot formed by the radiation beam on this layer. When writing data on an information carrier, the writing speed may change as a function of the position of the irradiating beam on the information layer. Changes in writing speed are encountered when writing on a disc-shaped information carrier rotating at a constant angular velocity. This applies both when writing at a radius-independent data rate and at a radially increasing data rate.

A recording method according to the preamble is known from the Japanese patent application no. JP-A 3-283021, the above citations are hereby incorporated herein in whole by reference.

SUMMARY OF THE INVENTION

The known method is suitable for writing marks in an information layer at different speeds. The inventors have determined that this known method is not suitable for direct-overwrite.

It is an object of the invention to provide a recording method which provides a reliable direct-overwrite recording at different writing speeds.

In the method of the invention the last pulse in the sequence has a first power level and is followed by a second power level lower then the first power level during a cooling period and, subsequently, by a third power level higher than the second power level, the duration of the cooling period being dependent on the writing speed. The writing of marks is made by the pulses at the first power level. Erasure of previously written marks in the spaces between presently written marks is made by irradiation at the third power level. The cooling period following the last pulse of the sequence and preceding the start of the erasure provides cooling of the information layer at the end of the sequence. If the cooling period is too short, the erasure starts too soon and will erase too much of the just written mark. If, on the other hand, the cooling period is too long, the erasure starts too late and previously written marks immediately following the just written mark will not be erased. There is an optimum duration of the cooling period when writing at a certain speed. When changing the writing speed, it turns out that the duration of the cooling period must be changed depending on the writing speed in order to obtain a proper transition from the write operation to the erasure operation, It is remarked that U.S. Pat. No. 5,109,373 to Ohno, hereby incorporated herein in whole by reference, discloses a pulse sequence for writing a mark in an information layer, the last pulse of the sequence being followed by a low power level during a certain period and, subsequently, a higher power level for erasure. However, the patent does not describe how the sequence must be modified when the writing speed is changed.

In a preferred embodiment of the method according to the invention the duration of the cooling period is linearly related to the inverse of the writing speed. Preferably, the length on the information layer corresponding to the cooling period has a constant value, independent of the writing speed and the type of information carrier.

Small variations in the number of pulses per unit of length of a mark are possible in embodiments where a disc-shaped carrier rotating at constant angular velocity is divided in several zones. Each of the zones is written at a constant angular density and zones at increasing radii are written at increasing angular density.

The length on the information layer corresponding to the cooling period depends on the overlap of the areas heated by S the last radiation pulse of the sequence and the start of the subsequent erasure. The size of a heated area is proportional to the size of the diffraction-limited spot formed by the radiation beam on the information layer. The length of the cooling period is therefore preferably proportional to 8/NA and lies in a range from 0.09 to 0.27 times 8/NA, where 8 is the wavelength of the radiation and NA is the numerical aperture of the radiation beam. This means that the cooling period has a duration preferably between 0.09 and 0.27 times 8/(NA*v), where v is the writing speed. In terms of channel-bit periods, the duration of the cooling period lies preferably within the range from $2.85*10^6$ to $8.54*10^6$ times 8(NA*v).

The pulses in a sequence for writing a mark have preferably a substantially equal pulse width, and a mark is written by a substantially constant number of pulses per unit of length of the mark independent of the writing speed. The control unit of a recording device can be simple, because the number of write pulses for forming a mark of a certain length need not be changed when the writing speed is changed. The combination of a substantial constant pulse width and an equal number of pulses per unit of length of the mark, provides an equal amount of radiation energy deposited per unit of length, resulting in the formation of marks which have a width independent of the writing speed. The method is very suitable for writing marks which can only have a discrete number of lengths, for instance, a length equal to an integer times a so-called channel-bit length. The number of write pulses for such a mark will then preferably be equal to the number of channel-bit lengths minus one or two.

The constant number of write pulses per unit of length and the equal width of the pulses does not apply to the leading and trailing edge of a mark. These edges, comprising together approximately one to two channel-bit lengths, form transient phenomena which are dealt with in special embodiments of the method according to the invention.

The pulses are preferably synchronized to a data clock signal, the frequency of which depends on the writing speed. When the frequency of the data clock is proportional to the writing speed, a substantially constant linear information density on the information layer can be realized. A coupling of the timing of the pulses to the data clock enables the proper formation of marks at all writing speeds. The coupling can be realized in the control unit by simple electronic means.

A simplification of the control unit of a recording device using the method, can be achieved by maintaining the power in the pulses substantially at a predetermined write level, independent of the writing speed and the length of the marks.

At relatively large speed differences, the write power preferably increases with decreasing write speed. The write power preferably has a linear dependence on the write speed. The advantage of this dependence is already noticeable when speed changes by a factor of 1.5. A decrease of the writing speed by a factor of two and a half and an associated increase of the write power in the range from 5% to 25%, improves the write performance. The higher power compensates for the increased cooling at low speeds due to the low duty cycle. A second aspect of the invention relates to a method of recording marks representing data at a writing speed in an information layer of an optical information carrier, by irradiating the information layer by a pulsed radiation beam. Each mark is written by a sequence of one or more pulses. In the method according to the invention the last pulse in the sequence has a first power level and is followed by a second power level, lower than the first power level, during a cooling period and, subsequently, by a third power level, higher than the second power level. The duration of the cooling period is between 0.009 and 0.27 times 8/(NA v), where 8 is the wavelength of the radiation of the beam, NA is the numerical aperture of the beam incident on the information layer and v is the wiring speed.

The length on the information layer corresponding to the cooling period depends on the overlap of the areas heated by the last radiation pulse of the sequence and the start of the subsequent erasure. The size of a heated area is proportional to the size of the diffraction-limited spot formed by the radiation beam on the information layer. When the duration of the cooling period is chosen in the indicated range, the corresponding length provides such an overlap of the heated areas that the rear edge of the written mark is defined properly. As a result, the jitter on reading the marks is reduced.

A third aspect of the invention relates to an optical recording device adapted for using the recording method according to the first aspect of the invention. The recording device records data in the form of marks on an information layer of an information carrier by irradiating the information layer by a radiation beam. The device includes a radiation source providing the radiation beam and a control unit for controlling the power of the radiation beam according to a writing speed. The control unit is operative for providing a sequence of one or more pulses having a first power level for writing a mark, the last pulse in the sequence being followed by a second power level during a cooling period and, subsequently, by a third power level. The duration of the cooling period is dependent on the writing speed.

A fourth aspect of the invention relates to an optical recording device adapted for using the recording method according to the third aspect of the invention. The optical recording device records data in the form of marks on an information layer of an information carrier at a writing speed v by irradiating the information layer by a radiation beam having a numerical aperture NA and a wavelength 8. The device includes a radiation source providing the radiation beam, and a control unit for controlling the power of the radiation beam according to a writing speed. The control unit is operative for providing a sequence of one or more pulses having a first power level for writing a mark, the last pulse in the sequence being followed by a second power level during a cooling period and, subsequently, by a third power level. The duration of the cooling period is between 0.09 and 0.27 times 8/(NA*v).

Those skilled in the art will understand the invention and additional objects and advantages of the invention by studying the description of the preferred embodiments below with reference to the following drawings which illustrate the features of the appended claims.

DETAILED DESCRIPTION OF PREFERRED EMBODIMENT

Figure 1A:
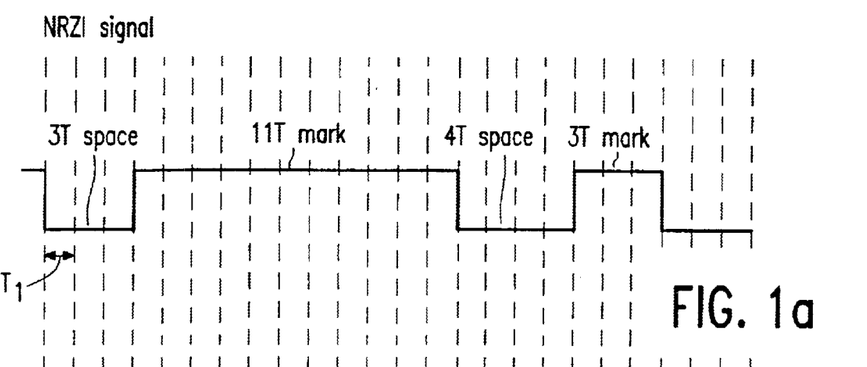
FIGS. 1a and 1b show diagrams of the time-dependence of the data signal and the control signal according to the invention.
Figure 1B:
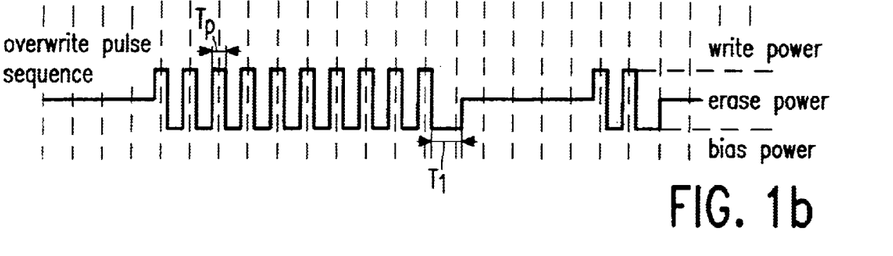

FIGS. 1a and 1b show diagrams of signals used in the recording method according to a specific embodiment of the invention. The trace of FIG. 1a gives the value of a digital data signal as a function of time, the value of the signal representing information to be recorded. The vertical dashed lines indicate transitions in a clock signal of a data clock belonging to the data signal. The period $T_w$ of the data clock, also called the channel-bit period, is indicated by $T_1$. The data signal changes value from 'high' to 'low' and 'low' to 'high' at transitions of the data clock. The data signal can be a so-called EFM coded signal, which can be 'low' for periods from $3T_l$ to $11 T_l$ and 'high' also for periods from $3T_l$ to $11T_l$. When recording the data signal, a 'high' period is recorded as a mark having a length corresponding to the duration or width of the 'high' period, and a 'low' period is recorded as an unwritten area between marks and having a length corresponding to the duration or width of the 'low' period.

The data is written in an optical information carrier having an information layer. The marks representing the data are written along a track in the information layer by a radiation beam. The marks are areas of the information layer having optical characteristics different from their surroundings, which makes optical reading of the marks possible. The length of a mark written in the information layer, is substantially equal to the number of channel-bit periods of the data signal, times the writing speed. The length of a mark can be expressed in channel-bit lengths, one channel-bit length being equal to one channel-bit period times the writing speed.

The trace of FIG. 1b shows the control signal corresponding to the data signal and used for modulating the power of a radiation beam with which the marks are being written on the information layer. The trace shows two sequences of write pulses for writing two marks. The pulses have an equal width $T_p$ and a pulse period of $T_1$. The centers of gravity of the pulses in the figure are located at the transitions of the data clock. The accuracy of centering of the pulses on the clock transitions is preferably within a range of $+/-T_p/5$. Alternatively, the trailing edge of the pulses may coincide with the clock transitions. A 'high' period of N channel bits in the data signal, a so-called NT mark, is recorded in the embodiment of the recording method shown in FIGS. 1a and 1b using N−1 write pulses. It is also possible to use n or N−2 write pulses for recording an NT mark. The height of the pulses corresponds to a write power level of the radiation beam. The power in between the pulses is at a bias level.

The power of the radiation beam, preceding and following a write sequence, is at an erase level, such that previously written marks in between marks to be written, are erased. Preceding the write pulses, the power is maintained at the erase level up to the rising edge of the first write pulse. Following the write pulses, the power is increased from the bias level to the erase level. When the trailing edges of the pulses coincide with clock transitions, the power increases to the erase level also at a clock transition. The figure shows a continuous 'high' erase level for a duration of several channel-bit periods. However, the erasure may also be produced by a series of short pulses during these periods.

The period directly following the last pulse of a write sequence at which the radiation power is at the bias level is called the cooling period. The duration of the cooling period is substantially equal to a channel-bit period $T_l$.

Figure 2:
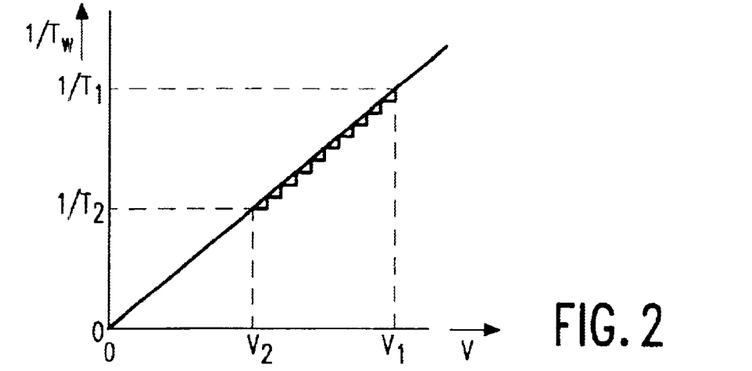
FIG. 2 shows the relation between the channel-bit period and the writing speed in accordance with the invention.

The influence of changes in the writing speed on the write procedure will now be explained by reference to FIG. 2 for a disc-shaped information carrier rotating at a constant angular velocity and having a substantially constant linear information density. FIG. 2 shows graphically the relation between the writing speed V and the inverse of the channel-bit period $T_w$. When the radiation beam scans a track near the out radius of the writeable area of the disc, the velocity between the information layer of the disc and the radiation beam is relatively high. This speed is called the writing speed and is indicated in FIG. 2 by $V_l$. The channel-bit period $T_w$, belonging to this writing speed is then equal to $T_1$ and is relatively short, as shown in the figure. When the radiation beam scans a track near the inner radius of the writeable area of the disc, the writing speed $V_2$ is smaller than near the outer rim. In order to produce the same linear density of marks along a track, the channel-bit period $T_w$ is made equal to $T_2$, which is longer than $T_1$. This relation is shown in the figure by a straight line, indicating the proportionality between the writing speed V and the inverse of the channel-bit period $T_w$ or the pulse period. As a consequence, when the writing speed from the outer to the inner radius of the disc decreases, for example by a factor of two, the channel-bit period increases substantially by the same factor of two. In other words, the frequency of the data clock increases with increasing radius of the track being written.

A clock circuit which must continuously adapt its frequency to an external parameter, in this case the radius of the track being written, is rather complicated. Therefore, in a special embodiment of the method according to the invention, the frequency of the clock is increased in steps when increasing the radius, so the clock circuit can provide a stable clock signal at each step. This step-wise increase in indicated by the staircase line in FIG. 2. In the figure the area of the disc between the inner and outer radius, is divided into then zones. Within each zone the frequency of the data clock is constant. A disc divided into zones in this way is called a zoned constant angular velocity (ZCAV) disc. In general, the number of zones will be between five and thirty for a radii ratio of two, depending on the comprise made between the highest information density of the information carrier and the lowest number of frequency changes of the data clock. This number of zones guarantees that the data clock frequency and the writing speed are everywhere on the disc close to the optimum relation given by the straight line in FIG. 2. Within a zone, the number of pulses per unit of length will slightly decrease at an increasing radius. The number of pulses per unit of length averaged over a zone will be independent of the writing speed. The variation of the number of pulses per unit of length, will depend on the speed variations and the number of zones. The variation is 18% for five zones with a lowest speed of 5 m/s and a highest speed of 12 m/s.

Figure 3A:
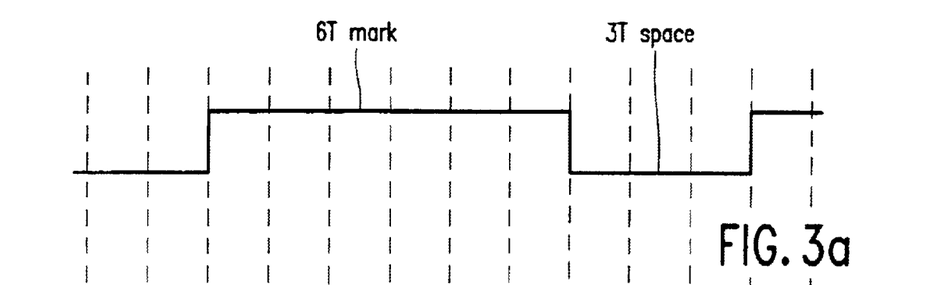
FIGS. 3a and 3b, shows diagrams of the time-dependence of various signals at a low writing speed in accordance with the invention.
Figure 3B:
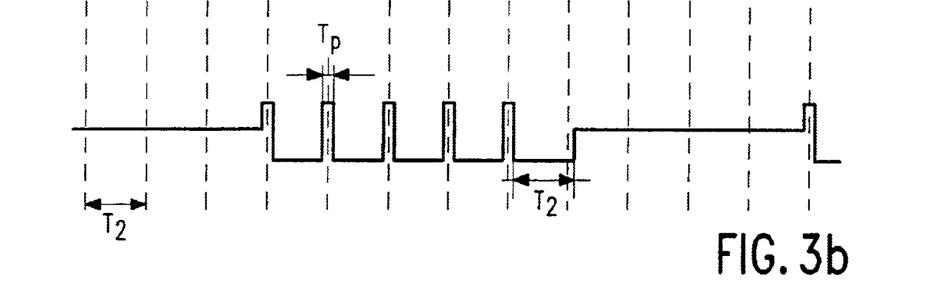

FIG. 1b shows a control signal at the outer radius of an information carrier, where $T_l$ is the channel-bit period belonging to the writing speed $V_l$ at the outer radius of the disc. FIGS. 3a and 3b show the control signals for the inner radius of the disc. FIGS. 1a–1b and 3a–3b are drawn to the same scale. The frequency of the data clock at the inner radius is about a factor of two lower than at the outer radius. Hence, the channel-bit period $T_2$ at the inner radius is about twice as long as the channel-bit period $T_1$ at the outer radius. The trace in FIG. 3a shows the data signal width the for a 6T mark. The appertaining control signal for the write sequence at speed $V_2$ is given in the trace of FIG. 3b. The six-channel-bit mark is written by five pulses their centers of gravity being located at the transitions of the data clock signal indicated by the vertical dashed lines. The width of the pules is equal to $T_p$, i.e. The same width as the write pulses used near the outer radius. The channel clock period is equal to $T_2$. The timing of the switching on and off of the erase power is also the same as near the outer radius. The thermal behavior of the information carrier is such that an N-channel-bit mark written at the outer radius has substantially the same length and width as an N-channel-bit mark written near the inner radius. The number of write pulses per unit of length of the written mark is thus independent of the writing speed. This write strategy allows to write marks at different writing speeds by changing only the frequency of the data clock. Therefore, the electronic implementation of the control unit can be relatively simple.

When a pulse sequence includes a first and last pulse having widths different from $T_p$, these widths are not changed when changing the writing speed. The distance between the first pulse and the next pulse and the distance between the one but last pulse and the last pulse have the same dependence on the writing speed as the distance between pulses having a width $T_p$.

The cooling period after the last pulse in the sequence of FIG. 3b has a duration equal to the channel clock period $T_2$. The duration of the cooling period is in this embodiment of the recording method according to the invention proportional to the inverse of the writing speed V.

The adaptation of the duration of the cooling period according to the write speed can be applied to many types of pulse sequences. A sequence for writing a mark may be represented by the notation K–L(M) in which K and L are numbers giving the width of the first and last pulse respectively in the sequence in units of channel-bit periods and M is an integer giving the number of pulses in a sequence for writing an NT mark. The duration of the pulses applies to writing at high speed, i.e. at speed $V_1$, in the above example. A sequence includes a number of write pulses having a width of $T_p$ between the first and last pulse; the number depends on the length of the first and last pulse and the length of the mark to be written. The two pulse sequences in the trace of FIG. 1b comprising 10 and 2 pulses of width $T_p$ can be represented by 0.5–0.5(N–1). The marks written by such sequences show a low jitter value on reading.

The first write pulse for a mark in the trace of FIG. 1b, is not preceded by another write pulse as in the case of write pulses in the middle of a sequence. Hence, the information layer is not pre-heated by a preceding pulse when the first write pulse is incident on the information layer. This could cause a lower temperature of the layer and a smaller width of the mark near the leading edge. This transient phenomenon is solved in the recording method shown in FIGS. 1a and 1b, by maintaining the erase level up to the start of the first write pulse, thereby preheating the information layer by the erase pulse. If more preheating is required, the level of the first pulse of a write sequence may be increased. Alternatively, the width of the first pulse may be increased. A width equal to twice the width of the following pulses in the sequence, may provide a reliable recording. The pulse sequence is then 1–0.5(N–1). The longer width of the first pulse is preferably combined with maintenance of the erase level up to the start of the first pulse.

A write pulse sequence requiring a relatively low write power is 1.5–0.5(N–2). This sequence contains 9 pulses for writing an 11T mark.

The quality of the written marks may be improved by increasing the width of the last pulse of a sequence. The extra energy deposited at the rear of the mark, improves the erasure of previously written marks at the location. The width of the last pulse is then preferably between 0.6 and 1.5 channel-bit periods. When used for writing information on a phase-change information layer, the width of the last pulse is preferably between 0.6 and 0.75 for phase-change layers having a relatively short crystallization time, i.e. shorter than 40 ns, and preferably between 1 and 1.5 for phase-change layers having a relatively long crystallization time, i.e. longer than 100 ns. An example of a sequence having a longer last pulse is 0.5–X(N–1) with X between 0.6 and 1.5 channel-bit periods. A more symmetrical sequence is 1.0–1.0(N–2).

The quality of the recordings made by the above sequences will be improved when they are followed by a cooling period having the duration according to the invention.

The bias level in the above pulse sequences corresponds to a relatively low power of the radiation beam between the write pulses, allowing a rapid cooling of the information layer after irradiation by a write pulse. The bias level may be equal to the erase level. However, the bias level is preferably smaller than 70% of the erase level. At that level there is sufficient cooling of the information layer after a pulse. At higher bias levels, the effect just written by the pulse may deteriorate due to the insufficient cooling in the period between the pulses and the heating by the subsequent pulse. The actual value of the bias power to be chosen within the range from 0 to 70% of the erase level, depends on the composition of a particular information carrier, and may be determined from the minimum jitter in a jitter versus bias power plot as measured on the information carrier, or from information recorded on the information carrier relating to recording parameters. Experiments have shown that a range of carriers from a certain manufacturer required an erase level of 4 mW and a bias level of 1.6 to 1.9 mW, i.e. smaller than 50% of the erase level. A range of carriers from another manufacturer had optimum overwrite characteristics at a bias level of 0 mW. For some information carriers the optimum bias level may be equal to the read level. When the bias power is larger than zero, it also gives some preheating for the next write pulse, reducing the write power required in the write pulse sequence.

The erase level is a predetermined power at which information previously written on an information carrier is erased. An optical recording device may obtain a power level for erasing, by reading a value for the erase power recorded on the information carrier or by making one or more test recordings on the information carrier.

The first pulse in the sequence shown in the trace of FIG. 1a starts from the erase level. However, the sequence, and also the other mentioned sequences, may start from the bias level. The bias level period preceding the first pulse is preferably shorter than one channel-bit period, in order to properly erase previously written marks just before the mark to be written.

The level of the radiation power in the cooling period, i.e. The cooling level, may be equal to the bias level, as shown in the trace of FIG. 1b. The erasure immediately after the last pulse of a sequence may be improved, while maintaining the proper definition of the rear edge of the just written mark, by setting the radiation power during the cooling period to a value in between the bias level and the erase level. In a preferred embodiment, the cooling level is set to a value within the range from 25% to 75% of the erase level. A cooling power higher than 75% of the erase level may cause too much heating after the last pulse of a write sequence, and as a consequence, the erasure following the sequence of pulses for writing a mark may start too early and erase the last part of the just written mark in an ill-defined way. This will increase the jitter when reading the marks. A cooling level below the optimum value gives an increase of the jitter caused by the rear edge of the marks, probably because then previously written marks immediately after the just written mark are not erased properly. Preferably, the read level is set to approximately 25% of the erase level, and the bias level is set to a value within a range from 0 to 25% of the erase power.

Figure 4A:
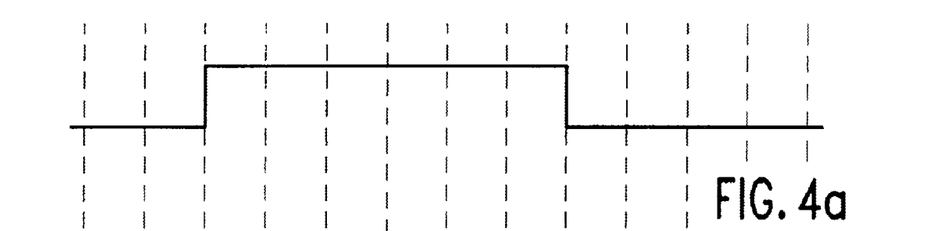
FIGS. 4a, 4b and 4c show diagrams of the time-dependence of various signals at a low writing speed according to the invention.
Figure 4B:
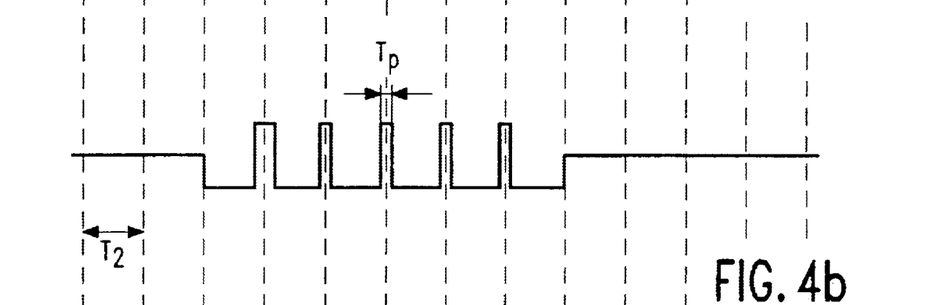
Figure 4C:
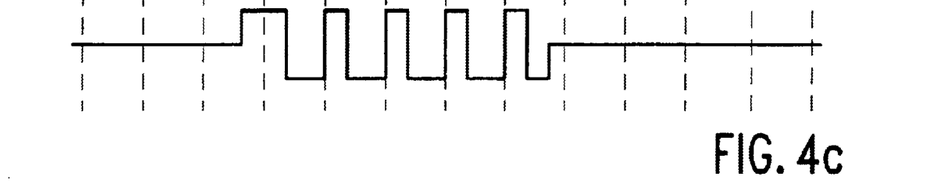

FIGS. 4a, 4b and 4c show control signals according to two embodiments of the recording method according to the invention. The trace of FIG. 4a shows the data signal and the trace of FIG. 4b shows the corresponding control signal for writing a six-channel-bit mark for the sequence 1.0–0.5(N1) at a low writing speed, comparable to the trace of FIG. 3b. However, in FIG. 4b, the erase power is switched off at the rising edge of the data signal, i.e. one data clock period plus half a pulse width before the end of the first write pulse. Moreover, the width of the first write pulse is increased by earlier switching on the write power than would be required for a write pulse of width $T_p$, i.e. earlier than $T_p$ before the end of the pulse, which end is at $T_p/2$ after the clock transition of the first pulse. The additional width increases the energy deposited in the information layer at the leading edge of the written mark, thereby compensating for the lack of preheating by the omitted pulse preceding this first write pulse. In another specific embodiment of the recording method that is not shown, only the write power in the first write pulse is increased instead of the width of the first write pulse. The duration of the trailing cooling period is equal to one channel-bit period $T_w$.

The trace in FIG. 4c shows a pulse sequence 1.0–0.5(N-1) for writing a 6T mark at a channel-bit period of $T_2$ according to another specific embodiment. The first pulse has a width twice as long as that of each of the four subsequent pulses. The width of each of the subsequent pulses is equal to half a channel-bit period $T_I$. The subsequent pulses start at a transition of the data clock. The width of the periods in between subsequent pulses is substantially equal. The cooling period following the last pulse has a width of half a channel-bit period $T_w$.

It will be clear that the different embodiments of pulse sequences for writing a mark as described above, can be used in the method according to the invention. The pulse pattern consisting of pulse widths and pulse periods is optimized at a certain speed, and subsequently modified for writing at a different speed by changing the pulse periods depending on the speed and keeping the pulse widths at the same values.

In an embodiment of the recording method, a recording device starts a write action on an information carrier, for instance in the form of a disc, by first reading write parameters stored on the disc. One of these parameters is the write power required for this particular type of disc. Instead of starting to write at the inner radius of the disc, as is usually done on optical discs, the device will preferably first make a test run by writing marks near the outer radius, because the values of the write parameters are more critical near the outer radius than near the inner radius. The test run calibrates the write power of the device and determines the value of the pulse width $T_p$ for proper writing at the outer radius. The quality of the test marks can be assessed by measuring jitter e.g. The jitter of the read signal from the marks. The assessment can also be made by counting errors detected by the error correction circuit, which is normally present in each optical recording device. Optimization of the writing speed at a given maximum power of the radiation source, leads in general, to a write pulse width $T_p$ about equal to half the channel-bit period $T_w$ at the outer radius, i.e. $T_I$. FIG. 1 shows the write pulse sequence near the outer radius, displaying a substantially 50% duty cycle control signal when writing a mark. The 50% duty cycle write pulse near the outer radius is a preferred value; the duty cycles may lie within a range from 40% and 60%. When writing at a different radius of the disc, only the channel-bit period $T_w$ must be adapted to the radius, or, equivalently, to the scanning speed according to the straight line or the stepped line in FIG. 2, while keeping the pulse width and the pulse power substantially constant.

In special cases, an improvement of the recording method can be achieved by slightly increasing the write power at reduced writing speeds. Experimentally, it has been found for a specific information carrier, that a decrease in write speed from 7.6 m/s to 3 ms/ requires a write power increase from 10.5 to 13 mW. Hence, a decrease of the write speed by a factor of two and a half requires a 25% increase in the write power. On other information carriers, a 10% increase has been measured for the same decrease in writing speed. On the information carrier, several write power values for different radii on the disc may have been stored, either by the manufacturer of the medium or by a first user who has made test runs on the information carrier. The recording device can then interpolate between these values to obtain the optimum write power for any radius on the disc. The interpolation may be linear or of an order higher than one. The recording device can also make test recordings at various radii before each write session and then determine the appropriate values of the parameters at each radius from these tests.

Figure 5:
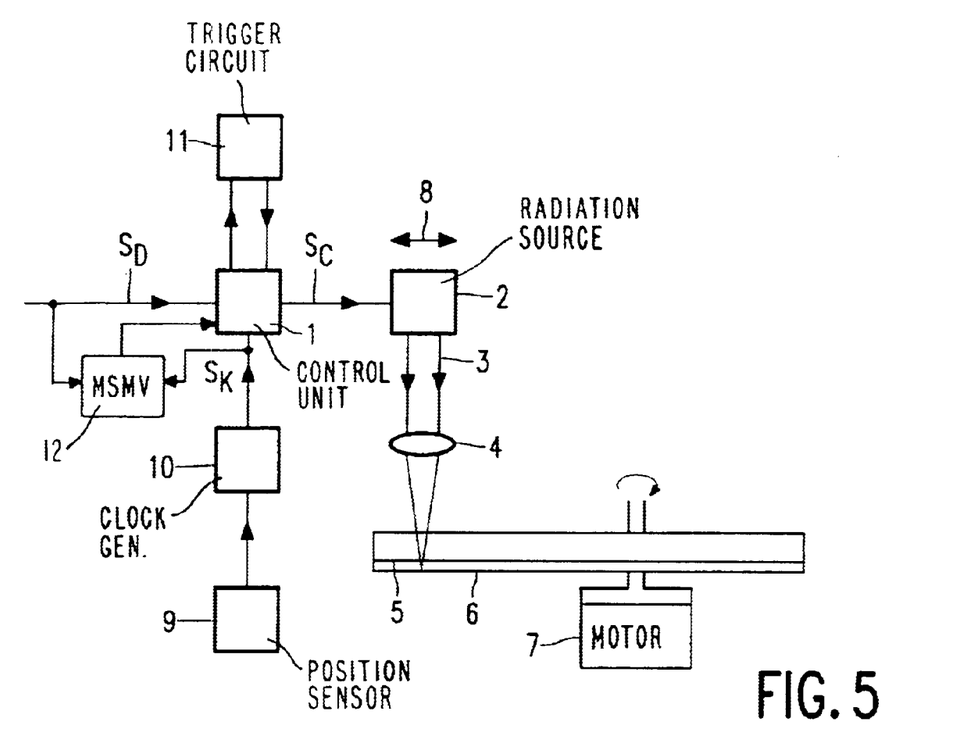
FIG. 5 shows a recording device according to the invention.

FIG. 5 shows a recording device according to the invention. A data signal $S_D$, comprising the information to be recorded, is connected to a control unit 1. The control unit forms a control signal out of the data signal according to one of the above methods. The control signal $S_C$, provided at the output of the control unit 1, is connected to a radiation source 2. The control signal controls the power of a radiation beam 3 generated by the source. The value of the control signal can switch between values representing the write level, erase level, bias level, and, when appropriate, the cooling level. The radiation beam is focused by a lens 4 onto an information layer 5 of an information carrier 6 in the form of a disc. The information carrier is rotated at a constant angular velocity around its center by a motor 7. When the radiation source 2 is displaced in a radial direction with respect to the disc, as indicated by arrow 8, the area of the information layer 5 can :be irradiated by the beam 3. A position sensor 9 detects the radial position of the radiation beam, for instance, by determining the radial displacement of the radiation source 2 or by deriving the position from signals read from the information layer. The position is fed into a clock generator 10, which generates a data clock signal $S_K$, the frequency of which increases with the radial distance of the radiation beam 3 from the center of the disc 6. In general, the clock signal is derived from a crystal clock, for instance, by dividing the crystal clock signal by a number dependent on the radial distance. The control unit 1 combines the data signal $S_D$ and the clock signal $S_K$ to generate the control signal $S_C$, e.g. by means of an AND gate, such that, the control signal contains write pulses of substantial equal pulse width and equal power, synchronized to the clock signal. The control unit may generate the pulses of equal width by means of a mono-stable multivibrator 12 triggered by the data signal and the clock signal. The multivibrator preferably has an adjustable pulse width to allow for different lengths of the first and last pulse of a sequence for writing a mark. The number of write pulses is constant for a unit length of a written mark. The control unit generates the same sequence of write pulses for writing a certain mark independent of the writing speed, only the rate at which the pulses are generated varies with the writing speed, i.e. with the radial position of the radiation beam. The trailing edge of the last pulse in a write sequence, triggers circuit 11, which generates a trigger pulse, one data clock period later. This trigger pulse is fed into the control circuit 1. The control circuit sets the control signal $S_C$ to the cooling level in The time interval between the trailing edge of the last pulse of a sequence and the trigger pulse. In this way the duration of the cooling period is equal to one data clock period, and changes inversely proportional to the radius on the disc or, likewise, to the writing speed.

When the recording device is used for writing at a single speed, the clock generator 10 is set at a fixed frequency, possibly with corrections for changes in the rotation rate of the information carrier 6. The position sensor 9 need not control the clock generator 10, and may be dispensed with. Trigger circuit 11 may be combined with the control unit 1. The control unit then sets the duration of the cooling period depending on the data clock and the values of the writing speed, the numerical aperture and the wavelength of the radiation beam.

Figure 6A:
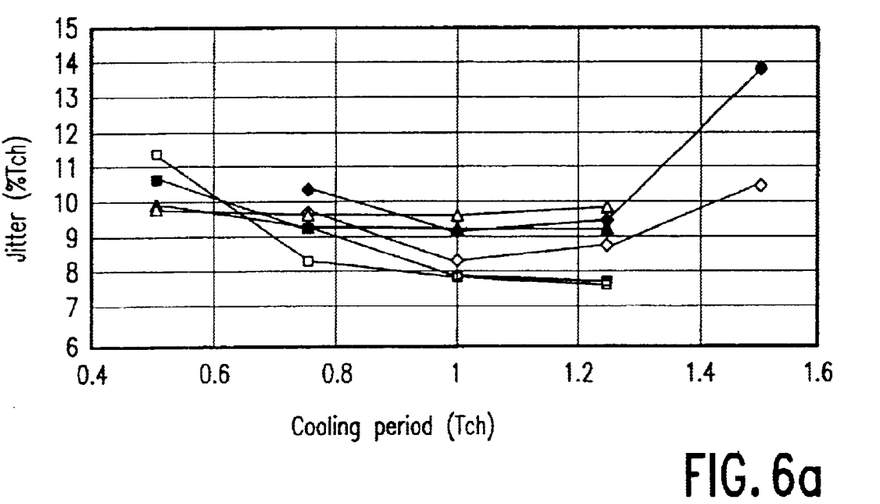
FIGS. 6a and 6b show diagrams with measurements on information written according to the invention at a high and low writing speed respectively.
Figure 6B:
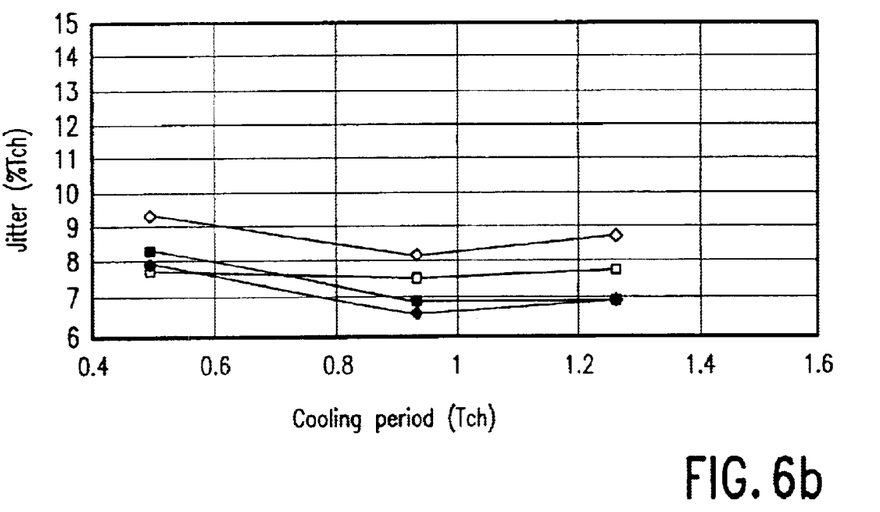

FIGS. 6a and 6b shows the results of recording experiments on phase-change information carriers using the method according to the invention. During the experiments marks were written in the information carrier, the marks were subsequently read and the jitter of the resulting read signal was determined. Both for FIGS. 6a and 6b, the sequence of pulses for writing the marks comprised three pulses of equal width and an erase level as shown in FIG. 1b. At the highest writing speed, 6.0 m/s, the pulses had a duty cycle of 50%. At lower speeds, the pulse width was kept constant and the pulse period increased inversely proportional with the speed. The duration of the cooling period, following the last pulse of the sequence, was set at affixed value during a test run, independent of the writing speed. In several test runs, the duration of the cooling period was varied from 0.5 to 1.5 times a channel-bit period (Tch). The channel-bit period at 6.0 m/s writing speed, is equal to 32 ns, corresponding to a displacement on the information layer of 0.19 μm. The channel-bit period at 2.4 m/s writing speed is equal to 80 ns, corresponding again to a displacement of 0.19 μm.

FIG. 6a shows the jitter of the read signal produced by reading marks that were written at a speed of 6.0 m/s as a function of the duration of the cooling period. Similarly, the jitter in FIG. 6b was produced by reading marks written at 2.4 m/s. The jitter is expressed as a percentage of the channel-bit period. The three types of symbols in the Figures, i.e. The squares, triangles and diamonds, represent measurements on information carriers of three different manufacturers. The filled-in symbols are measurements made after 8 overwrite cycles. The open symbols are measurements made after 1024 overwrite cycles.

Both Figures show that a cooling period between half a channel-bit period and one and a half channel-bit period gives a good jitter performance, independent of the writing speed, the number of overwrite cycles and the manufacture of the information carrier. The lowest jitter is obtained when the cooling period has a duration of one channel-bit period. The length on the information layer corresponding to the cooling period is equal to the duration of the cooling period times the writing speed. The channel-bit period in FIG. 6a is equal to 32 ns and the writing speed is 6 m/s, giving a length of 0.19 μm. The experiments indicate that a good jitter performance is obtained when the length corresponding to the cooling period is independent of the writing speed and lies within a range from 0.1 to 0.3 μm. For high performance applications, demanding a lower jitter value, the length is preferable in the range from 0.17 to 0.21 μm with an optimum value substantially at 0.19 μm, everything at the above values of γ and NA. The lower jitter in this smaller range is due to an advantageous combination of a fast cooling of the information layer after the last pulse, resulting a good definition of the rear edge of the written mark, and a sufficient erasure of previously written marks. At the optimum value, the cooling period may be equal to the clock period, allowing a simple electronic implementation.

The channel-bit period in the experiments was chosen to obtain a high information density at a low jitter value. When a lower density is used, the duration of the cooling period expressed in channel-bits must be reduced accordingly. The required length of the cooling period is related to the overlap of the area on the information layer heated by the last write pulse and the area heated at the start of the subsequent erasure. The size of the heated area is related in turn to the size of the diffraction-limited spot formed by the radiation beam on the information layer. The size of the spot is proportional to $\gamma/NA$, where $\gamma$ is the wavelength of the radiation and NA is the numerical aperture of the radiation beam incident on the information layer. The experiments of FIG. 6a and 6b, have been made at a wavelength of 660 nm and a numerical aperture of 0.6. When changing to another wavelength or another numerical aperture, the length corresponding to the cooling period will scale with $\gamma/NA$.

When the above lengths of the cooling period are expressed in terms of spot size, the length lies preferably in the range from 0.09 to 0.27 $\gamma/NA$, and for high performance applications, in the range from 0.15 to 0.19 $\gamma/NA$ with an optimum value substantially at 0.17 $\gamma/NA$.

The advantages mentioned above, for the specified ranges of the cooling period duration, are not only obtained in methods for recording at different speeds but also in methods for recording in an information carrier at a single speed.

The recording method according to the invention, is eminently suitable for recording marks on a phase-change information layer, especially for writing amorphous marks in a crystalline information layer. The short write pulses, especially at the inner radius of a disc, allow a proper control of the write process in view of the amorphization and re-crystallization of the phase-change material.

The recording method according to the invention, can also be used for recording data on different information carriers designed for different writing speeds, for instance, because of different types of information layers in the discs. The pulse width is determined for the channel-bit period of the information carrier having the highest writing speed. When recording a disc at a lower writing speed, the pulse width is not changed, but only the channel-bit period is increased in accordance with the specification of the information carrier. Hence, a recording device can record on different types of information carriers by merely changing the channel-bit period and, if appropriate, the write power.

The invention has been disclosed with reference to specific embodiments, to enable those skilled in the art to make and use the invention, and to describe the best mode contemplated for carrying out the invention. Those skilled in the art may modify or add to these embodiments without departing from the spirit of the invention. Thus, the scope of the invention is only limited by the following claims.

What is claimed is:

1. A method of recording marks representing data in an information layer of an optical information carrier comprising the steps of:

moving the carrier with respect to a radiation beam so that linear writing speed varies during recording so that different portions of the same carrier are recorded at different linear writing speeds;

writing a mark on the carrier by a sequence of one or more irradiation pulses, in which the last pulse in the sequence has a first power level;

irradiation at a second power level lower than the first power level during a cooling period to allow the carrier to cool after writing the mark, the duration of the cooling period depending on the spot size of the radiation on the carrier and the duration of the cooling period varying depending on the linear writing speed; and after irradiating at the second power level, irradiating at a third power level higher than the second power level to provide an unmarked space between marks.

2. The method according to claim 1, wherein:

the writing speed varies;

the duration of the cooling period lies between 0.09 and 0.27 times $\lambda/NA*v$), where $\lambda$ is the wavelength of the radiation of the beam, NA is the numerical aperture of the beam incident on the information layer, and v is the writing speed;

the pulses are synchronized to a data clock signal providing pulses defining a data clock period;

the duration of the data clock period is inversely proportional to the linear writing speed;

multiple pulses of the one or more pulses being at the same power level and having the same duration;

a first pulse of the one or more pulses is at a higher power level or has a longer duration than the multiple pulses;

the last pulse is at a different power level or has a different duration than the multiple pulses;

the duration of the cooling period is sufficiently long to prevent the erasure of the mark and sufficiently short to allow erasing of any previously written mark at the same position on the information layer;

the duration of the cooling period is less than approximately 1.5 times the duration of a data clock period;

the pulses in a sequence have a substantially equal pulse width and a mark is written by a substantially constant number of pulses per unit length of the mark independent of the writing speed;

the cooling period follows the writing of the mark and the irradiating at a third power level follows the cooling period;

the write power varies linearly with the linear writing speed;

the marks are written with the same number of pulses per unit length of the mark along the record carrier regardless of variations in linear writing speed;

the length that the carrier moves with respect to the radiation beam during the cooling period is approximately constant regardless of the variation in linear velocity of the movement;

the surface of the carrier is divided into one or more zones, the linear velocity of writing marks is different in different portions of the same zone, and the duration of the pulses for writing marks is constant within each zone regardless of the variation of linear velocity of writing within the zone;

the write power varies linearly with the linear writing speed;

the duration of the cooling period is selected to minimize jitter on reading the marks; and the carrier is disk-shaped and rotates about an axis and the writing speed varies in proportion to the radius from the axis at which the marks are written.

3. An optical recording device for recording data in the form of marks on an information layer of an information carrier, the device comprising:

a radiation source providing a radiation beam for writing the marks;

means for moving the information carrier with respect to the beam so that the linear writing speed varies with different portions of the same carrier are recorded at different linear writing speeds;

a control unit for controlling the power of the radiation beam depending on the linear writing speed including:

means for providing a sequence of one or more irradiation pulses having a first power level for writing a mark;

means for providing irradiation at a second power level during a cooling period to allow the carrier to cool after writing the mark, the duration of the cooling period depending on a spot size of the radiation on the carrier and the duration of the cooling period varying depending on the linear writing speed; and means for after irradiation at the second power level, providing irradiation at a third power level to provide an unmarked apace between marks.

4. The device according to claim 3, wherein:

the writing speed varies;

the duration of the cooling period is linearly related to the inverse of the writing speed;

the device further comprises a clock generator for providing at an output a data clock signal depending on the writing speed of the marks, the output of the clock generator being connected to the control unit for controlling the duration of the cooling period in accordance with the data clock signal;

the device has a writing speed v; the radiation beam has a numerical aperture NA and a wavelength $\lambda$; and the cooling period lies between 0.09 and 0.27 times $\lambda/(NA*v)$;

the write power varies linearly with the linear writing speed;

multiple pulses of the one or more pulses being at the same power level and having the same duration;

a first pulse of the one or more pulses is at a higher power level or has a longer duration than the multiple pulses;

the last pulse is at a different power level or has a different duration than the multiple pulses;

the duration of the cooling period is sufficiently long to prevent the erasure of the mark and sufficiently short to allow erasing of any previously written mark at the same position on the information layer;

the marks are written with the same number of pulses per unit length of the mark along the record carrier regardless of variations in linear writing speed;

the length that the carrier moves with respect to the radiation beam during the cooling period is approximately constant regardless of the variation in linear velocity of the movement;

the surface of the carrier is divided into one or more zones, the linear velocity of writing marks is different in different portions of the same zone, and the duration of the pulses for writing marks is constant within each zone regardless of the variation of linear velocity of writing within the zone;

the write power varies linearly with the linear writing speed;

the duration of the cooling period is selected to minimize jitter on reading the marks; and the cooling period immediately follows the last pulse for writing of the marks, and the irradiating at a third power level immediately follows the cooling period.

* * * * *